Patented Nov. 10, 1931

1,830,838

UNITED STATES PATENT OFFICE

HEINRICH HOPFF, OF LUDWIGSHAFEN-ON-THE-RHINE, GERMANY, ASSIGNOR TO GENERAL ANILINE WORKS, INC., OF NEW YORK, N. Y., A CORPORATION OF DELAWARE

ANTHRAQUINONE-1-CARBOXYLIC ACID

No Drawing. Application filed April 16, 1929, Serial No. 355,670, and in Germany April 28, 1928.

The present invention relates to the production of anthraquinone-1-carboxylic acid from benzanthrone.

I have found that anthraquinone-1-carboxylic acid and derivatives thereof, for example nitro, amino or halogen derivatives, are readily obtained by heating a benzanthrone which may be substituted in the anthrone ring, in aqueous suspension in the presence of a substance having alkaline reaction with oxygen or gases containing the same, such as air, inert against alkalies in a closed vessel to temperatures above 150° C., preferably between 150 and 200° C., at the corresponding increased pressure. As substances having an alkaline reaction any such inorganic and organic substances may be employed, for example the hydroxides of alkali and alkaline earth metals, salts of the said hydroxides with weak acids, such as for instance sodium carbonate, potassium carbonate, sodium acetate and the like, ammonia and the like. Organic bases, such as for instance mono-, di- and trimethylamine, ethanolamine, cyclohexylethanolamine, pyridine and the like, have proved suitable for the purpose of the present invention. The process is preferably carried out with a positive oxygen pressure of from 20 to 50 atmospheres or even more.

The following example will further illustrate how the invention is carried out in practice, but the invention is not limited thereto. The parts are by weight.

Example 23 parts of benzanthrone and 1000 parts of $n/10$ caustic potash solution are heated for 15 hours to 200° C., while stirring, under a pressure of 50 atmospheres of oxygen. On acidifying the resulting red-brown solution, anthraquinone-1-carboxylic acid separates out as a yellow precipitate which on recrystallization from glacial acetic acid melts at about 292° C.

What I claim is:—

1. A process of producing anthraquinone-1-carboxylic acids, which comprises heating a benzanthrone in aqueous suspension in the presence of a substance having alkaline reaction with a gas containing oxygen inert against alkalies in a closed vessel to temperatures above 150° C.

2. A process of producing anthraquinone-1-carboxylic acid, which comprises heating benzanthrone in an aqueous solution of caustic alkali under a pressure of 50 atmospheres of oxygen to about 200° C.

In testimony whereof I have hereunto set my hand.

HEINRICH HOPFF.